United States Patent
Pakin et al.

(10) Patent No.: US 9,324,160 B2
(45) Date of Patent: Apr. 26, 2016

(54) SYSTEM AND METHOD FOR STABILIZING DIGITAL IMAGE SEQUENCES

(75) Inventors: Sait Kubilay Pakin, Ankara (TR); Mehmet Umut Demircin, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 0 days.

(21) Appl. No.: 14/377,172

(22) PCT Filed: Feb. 6, 2012

(86) PCT No.: PCT/IB2012/050532
§ 371 (c)(1),
(2), (4) Date: Aug. 6, 2014

(87) PCT Pub. No.: WO2013/117959
PCT Pub. Date: Aug. 15, 2013

(65) Prior Publication Data
US 2014/0354835 A1 Dec. 4, 2014

(51) Int. Cl.
*H04N 5/232* (2006.01)
*G06T 7/20* (2006.01)
*G06T 7/00* (2006.01)

(52) U.S. Cl.
CPC .............. *G06T 7/204* (2013.01); *G06T 7/0038* (2013.01); *G06T 7/20* (2013.01); *H04N 5/23267* (2013.01); *G06T 2207/10016* (2013.01); *G06T 2207/20068* (2013.01); *G06T 2207/20201* (2013.01)

(58) Field of Classification Search
CPC .................. G06T 7/20–7/2093; G06T 7/0038; H04N 5/144–5/145; H04N 5/23254; H04N 5/23267; H04N 5/2327; H04N 5/23274; H04N 5/23277; H04N 5/23228; H04N 5/23264; G08B 13/19602–13/19615; G09G 2320/106; G03B 2207/005; G03B 2205/0007; G02B 27/606

USPC .............. 348/154–155, 169–172, 208.6, 699, 348/208.4, 208.99, 208.1, 208.13; 382/107, 382/215, 236; 396/52, 54, 55, 153, 492
See application file for complete search history.

(56) References Cited

U.S. PATENT DOCUMENTS

| | | | |
|---|---|---|---|
| 7,755,667 B2 * | 7/2010 | Rabbani | H04N 5/23248 348/208.6 |
| 2006/0274156 A1 | 12/2006 | Rabbani et al. | |
| 2008/0309769 A1 * | 12/2008 | Albu | H04N 5/144 348/208.1 |
| 2014/0085492 A1 * | 3/2014 | Petrescu | H04N 5/23248 348/208.1 |
| 2014/0205146 A1 * | 7/2014 | Holz | G06T 7/2046 382/103 |

FOREIGN PATENT DOCUMENTS

| | | |
|---|---|---|
| EP | 1978731 A2 | 10/2008 |
| KR | 20100050906 | 5/2010 |
| WO | WO2007/123453 A2 | 11/2007 |

OTHER PUBLICATIONS

Felx Albu, Low Complexity Global Motion Estimation Techniques for Image Stabilization, Electrical Engineering, 2008. ICEE 2008. Second International Conference on, IEEE, Piscataway, NJ, USA, Mar. 25, 2008, pp. 1-2, XP031295091.

* cited by examiner

*Primary Examiner* — Tuan Ho
*Assistant Examiner* — Marly Camargo
(74) *Attorney, Agent, or Firm* — Gokalp Bayramoglu

(57) ABSTRACT

The present invention relates to the field of image processing and image stabilization methodologies used on image acquisition and processing systems. A method and apparatus to generate an image sequence output that is stable and free of any sudden jumps from an image sequence input acquired with an imaging system whose line of sight is fixed but may drift in time, and by efficiently updating the reference frames that are used in the image stabilization, the method can be optimized.

17 Claims, 4 Drawing Sheets

SYSTEM AND METHOD FOR STABILIZING DIGITAL IMAGE SEQUENCES

FIELD OF THE INVENTION

The present invention relates to the field of image processing and image stabilization methodologies used on image acquisition and processing systems.

BACKGROUND OF THE INVENTION

It is known that there are methods and models to stabilize video frames captured at a constant frame rate. Stabilization is implemented to reduce or remove vibrations on the image sequence, for example caused by the shaking hands of a camera user. This kind of a jitter or vibration reduction is crucial since such vibrations disturb the viewing experience; reduce image quality and the performance of possible subsequent image processing modules. Stabilization methods provide means of computing the jitter related transformation between two video frames and compensate this movement by warping the current frame accordingly. Even the video sequences captured with fixed line of sight cameras may contain "jitter" due to various environmental factors, such as wind, affecting the camera platform or mount. Stabilization methods may also be applied to pre-recorded videos or image sequences in addition to the live video acquisition.

In currently used methods, the image sequence or image frames are generally captured by image sensors consisting two dimensional arrays of pixels. Depending on the sensor, the images might be coloured or greyscale. The output of infrared (IR) cameras can be considered as greyscale. Essentially, stabilization algorithms register every frame obtained from the image source with a reference frame. They accomplish this, generally, by computing the parameters of the assumed transformation between the two frames. This transformation can be purely translational with two parameters. Alternatively, more complex models such as affine or perspective with 6 and 8 parameters, respectively, can be employed. The transformation that the stabilization method utilizes should be chosen depending on the application.

Apart from registering the reference and current frames, the update of the reference frame is a necessity; especially if the stabilization will be deployed on a system which is supposed to work for a long time without interruption. This necessity occurs even when the camera has a fixed line of sight. The necessity stems from the fact that when the system works for a prolonged time, permanent shifts might occur in the line of sight. Furthermore, since almost all registration methods work on the color/grayscale similarity between the reference and current frames, any kind of illumination changes in the environment (or temperature change in the case of infrared cameras) would deteriorate this similarity. Thus the reference frame has to be updated regularly to ensure that it reflects the current state of the environment.

The United States patent document US2006274156, an application in the state of the art, discloses an image sequence stabilization method and a camera, wherein a sequence of input digital images are captured and replicated to provide a corresponding sequence of archival images and a corresponding sequence of display images.

The said method resembles the present invention in that it can perform stabilization using pixel projection correlations. But the present invention differs from the said method in terms of optimizations for a fixed line of sight camera.

The Korean patent document KR20100050906, an application in the state of the art, discloses a method for stabilizing an image sequence and a method for updating the reference frame according to the magnitude of the motion vector.

The present invention differs from the said method in terms of the update technique of the reference frame. Present invention does not only decide whether to update reference frame according to the magnitude of the motion vector but also determines "how" to update it.

SUMMARY OF THE INVENTION

An objective of the present invention is to generate an image sequence output that is stable and free of any sudden jumps, from an image sequence input acquired with an imaging system whose line of sight is fixed but may drift in time.

Another objective of the present invention is to provide an efficient and optimized methodology for registering (aligning) current frames to reference frames in an image sequence input acquired with an imaging system whose line of sight is fixed but may drift in time.

Another objective of the present invention is to provide an efficient and optimized methodology for updating the reference frames that are used in the stabilization of an image sequence input acquired with an imaging system whose line of sight is fixed but may drift in time.

DETAILED DESCRIPTION OF THE INVENTION

A system and method realized to fulfil the objective of the present invention is illustrated in the accompanying figure, in which.

Figure 1:
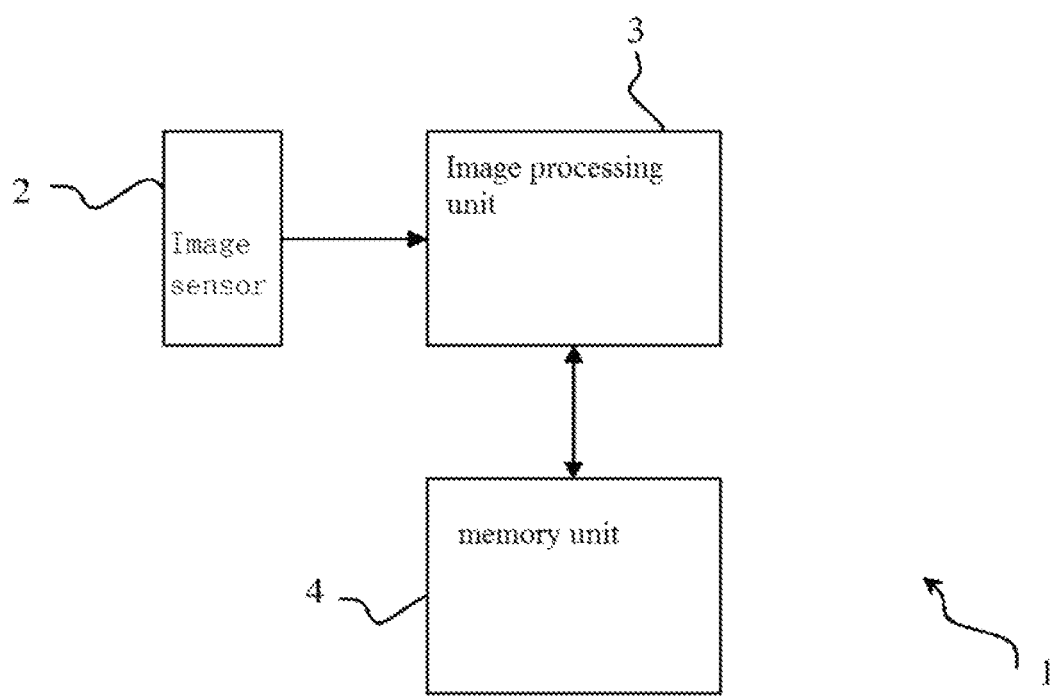
FIG. 1 is the schematic view of a preferred embodiment system.

The components illustrated in the figures are individually numbered where the numbers refer to the following:
1. System for stabilizing digital image sequences
2. Image sensor
3. Image processing unit
4. Memory unit
P. New projection
R. Reference projection.
X. Neglected values
F. Received image
B. Bounding box A method for stabilizing image sequences (100) fundamentally comprises the following steps,
- receive the current frame (101),
- generate the projections for the current frame, neglecting predetermined number of pixels from the beginning and the end of projections (102),
- calculate translational displacement vector for the current frame with respect to the reference frame by computing sums of absolute differences (SAD) by superposing the respective projections in predetermined shift steps without allowing current frame's projections go out of the reference frame's respective projections' end points (103),
- make a record of the translation vector for the current frame with respect to the reference frame (104), warp the current frame according to the computed translation vector and outputting the warped image (105), increase the processed frame count by one (106), is the processed frame count smaller or equal to a first predetermined value? (107), compute the average translational displacement vector of frames processed since the latest reference frame update (108), does a recorded best reference frame candidate so far exist? (109), is the average translational displacement larger than a first translation threshold? (110).

is the average translational displacement larger than a second translation threshold? (111), is the displacement vector of the current frame closer to the calculated average displacement vector than that of the best reference frame candidate so far? (112), is the displacement vector magnitude of the current frame smaller than that of the best reference frame candidate so far, and is the displacement vector of the current frame closer to the calculated average displacement vector than that of the best reference frame candidate so far? (113).

is the displacement vector magnitude of the current frame smaller than that of the best reference frame candidate so far? (114), record the current frame as the best reference frame candidate so far, together with its displacement vector and projections (115), is the processed frame count equal to a second predetermined value? (116), set the best reference frame candidate so far, as the new reference frame (117), reset the processed frame count and clear the candidate reference frame data (118), receive a new frame, set it as the new reference frame and reset the processed frame count (119).

Figure 4:
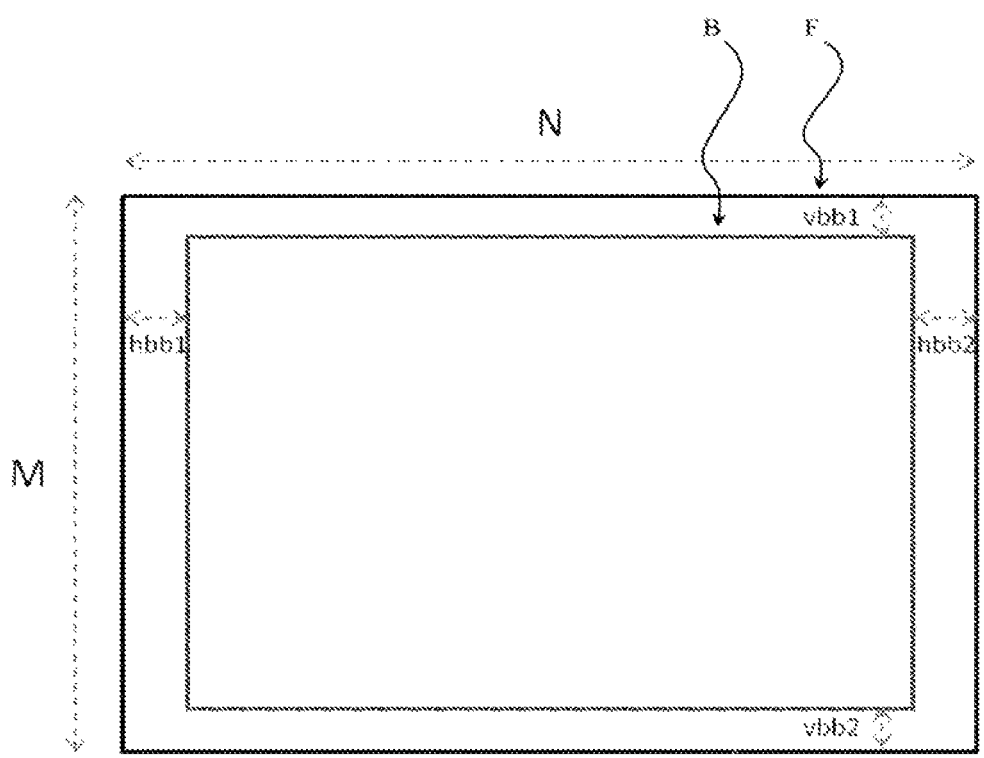
FIG. 4 is a conceptual illustration of cropping an image.
Figure 5:
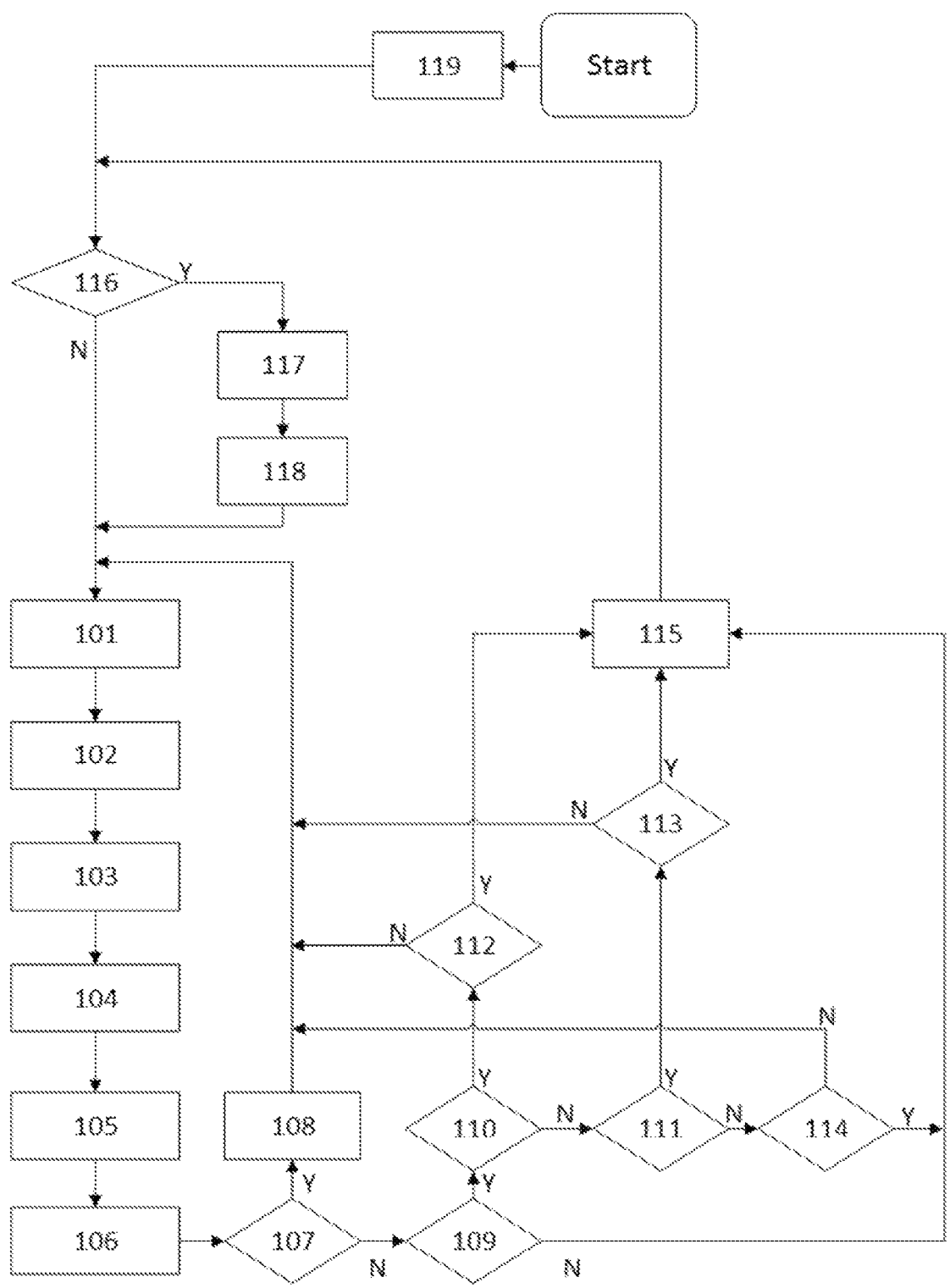
FIG. 5 is the flowchart of the preferred method of the present invention.

There is a main loop in the method (100), which is repeated for each frame received or captured. First, a new frame data is received (101) and then the projections of the received frame are calculated (102). In the preferred configuration, the projections are computed by summing the pixel intensities along horizontal and vertical directions over a two dimensional image. For a two dimensional (M by N) image (F) (FIG. 4), horizontal ($P_H'$) and vertical ($P_V'$) pixel projections are calculated by the formulas;

$$P_H'(x) = \sum_{y=1}^{M} F(x, y), \quad \text{for } x = 1 - N$$

and $$P_V'(y) = \sum_{x=1}^{N} F(x, y), \quad \text{for } y = 1 - M$$

Figure 2:
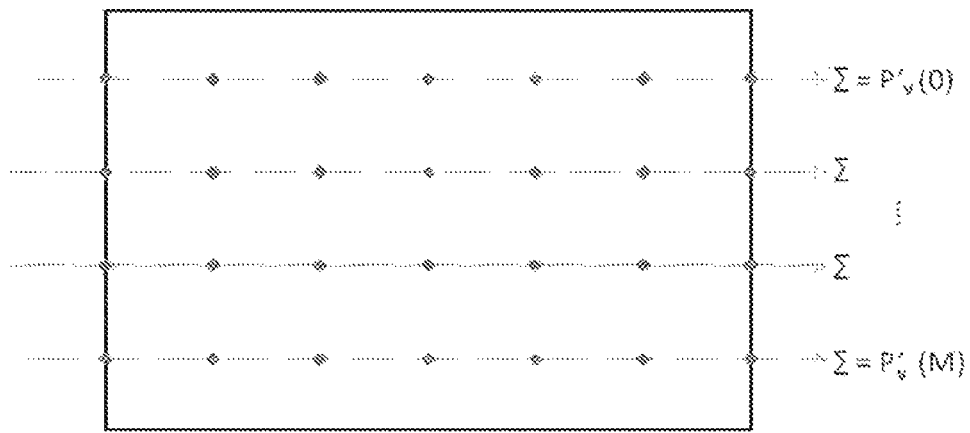
FIG. 2 is a conceptual illustration of the vertical projection calculation done for every pixel row of a two dimensional image.

The function F(x, y) represents the pixel intensities at horizontal (x) and vertical (y) coordinates. $P_H'$ varies with the column index since a sum for each column is calculated. The parameter y has a similar meaning in $P_V'$, i.e., sums of intensities are computed for each pixel row. (FIG. 2)

Furthermore, projections are normalized by subtracting their average intensity. Normalization makes the stabilization process more robust when there is a bias or brightness difference between the received and the reference images. The respective averages ($\overline{P'_H}$ and $\overline{P'_V}$), are calculated for a two dimensional image using formulas;

$$\overline{P'_H} = \sum_{x=1}^{N} P'_H(x)/N$$

and $$\overline{P'_V} = \sum_{y=1}^{M} P'_V(y)/M$$

where M and N are numbers of rows and columns, respectively. The normalized horizontal ($P_H$) and vertical ($P_V$) pixel projections can be calculated using the equations;

$$P_H(x) = P'_H(x) - \overline{P'_H}, \quad P_V(y) = P'_V(y) - \overline{P'_V}$$

In projection calculations, a predetermined amount of pixels are neglected from the boundaries of the newly captured frame. (For example horizontal projections are not calculated for columns 1 to N but calculated for columns 5 to N-4). This is equivalent to neglecting the borders of the new image's projections (P). The width of these preferentially symmetrical neglected values (X) corresponds to the maximum translation value that the stabilization system handles. It is a value that depends on the conditions of the camera capturing the image sequence.

Figure 3:
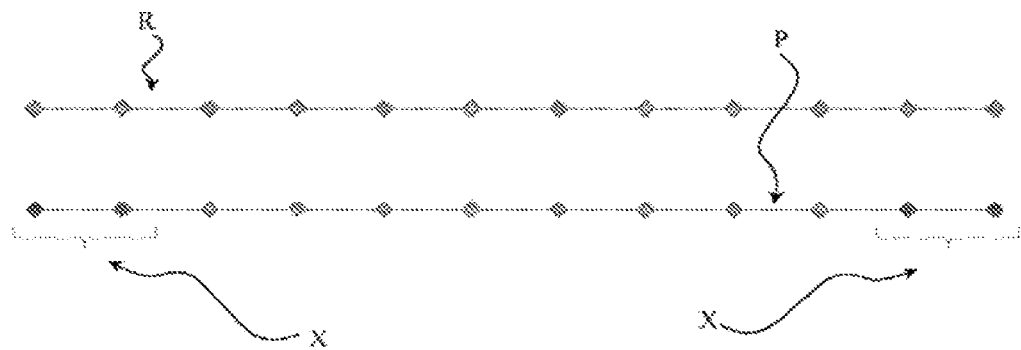
FIG. 3 is a conceptual illustration of a set of projections computed from current and reference frames.

Then the sets of normalized projections are used to calculate a translation vector for the new frame with respect to the reference frame, using sum of absolute differences (SAD) between the projections of current and reference frames (103). The calculation of translation parameters is accomplished by sliding the new projection (P) on the reference projection (R) by a predetermined displacement at each calculation step. A sum of absolute differences for each position of the new projection relative to the reference is obtained, without allowing new frame's (P) projections go out of the reference frame's (R) respective projections' boundaries. The displacement with the minimum SAD gives the translation amount on that axis. (FIG. 3)

When the number of neglected points at the ends of the new projection are $S_{max}$, predefined displacement step is one pixel, and subscripts ref and cur represent reference and current projections, respectively, then SAD for every possible displacement, m, between $-S_{max}$ and $S_{max}$ becomes:

$$SAD_Y(m) = \sum_{k=S_{max}}^{N-S_{max}} |P_{H,ref}(k+m) - P_{H,cur}(k)|,$$

$$m = -S_{max} - S_{max}$$

The m value with the minimum SAD is the translational displacement between the reference and the new frame. The total number of SAD calculations depend on $S_{max}$ value, which in turn depends on the maximum possible translation for the imaging system.

In a preferred configuration, the SAD calculations are done on a sub-pixel scale by interpolating the projections to estimate values in between the discrete data points. Sub-pixel processing improves the stabilization performance since the jitter on image sequences captured by fixed line of sight cameras is generally small in magnitude. The above equations also apply to sub-pixel processing case, only the parameters change accordingly. Fast, "golden search"-like, search methods are applied in a preferred configuration which has a computational complexity of O(log n), compared to the O(n) complexity of exhaustive search. Hierarchical search is used in a preferred configuration. Empirical studies have shown that the SAD function has a quadratic like shape allowing fast algorithms to convergence to the result relatively fast.

Then, the new frames' displacement vector with respect to the reference frame is recorded (104). This data will be used for further calculations. Using the computed displacement vector, the input image is warped and a stabilized output image is obtained (105). Processed image count is incremented after each frame is processed to control the process flow (106). These steps are executed for each received or captured frame forming the main processing loop. In a preferred configuration of the inventive method, a bounding box (B) is used to crop all the received images (F) in step (101). Cropping prevents any distortion around the edges that may adversely affect the stabilization performance. The projection calculations for a two dimensional image are follows;

$$P'_H(x) = \sum_{y=vbb1}^{M-vbb2} F(x, y), \quad \text{for } x = hbb1 - N - hbb2$$

and $$P'_V(y) = \sum_{x=hbb1}^{N-hbb2} F(x, y), \quad \text{for } y = vbb1 - M - vbb2$$

where vbb1 pixels from the top, vbb2 pixels from the bottom, hbb1 pixels from left and hbb2 pixels from right are disregarded.

After executing steps (101), (102), (103), (104), (105), and (106), "is the processed frame count smaller than or equal to a first predetermined value?" (107) test is applied to branch the execution loop to an average calculation step. Translation vector average statistics are collected in step (108) for frames within the first predetermined count ("trend" stage). Translation vector averages are used in the upcoming algorithm steps.

In a preferred configuration, the average is not calculated every time in the step (108), but only calculated when the first predetermined number of processed frames is reached. If the answer to the initial question (107) is "no", then this means that the translation vector statistics were collected and another loop to determine a new reference frame can be started. In this second loop, every frame up to a second predetermined frame count, is considered a candidate reference frame and they are compared with each other to find the best one for the current case. This second loop starts with the "does a recorded best reference frame candidate so far exists?" (109) check, to make sure that the first best candidate is initialized. If there is no candidate yet (second loop is entered for the first time after the first loop is completed), the current frame is set as the best candidate in step (115). Starting from the subsequent iteration, the newly obtained frames are compared with the best reference frame candidate so far, in steps (112), (113) and (114).

There are three main categories (or sub-methods) to determine the flow of the new reference frame selection algorithm. Translation vector average statistics collected in step (108) are used to judge the correctness of the last reference frame. One of the three aforementioned categories are selected based on the correctness level determined with the "is the average translational displacement larger than a first translation threshold?" (110), and "is the average translational displacement larger than a second translation threshold?" (111) checks introduced in a preferred configuration.

If the average translational displacement with respect to the last reference frame is large (which means the answer to "is the average translational displacement larger than a first translation threshold?" (110) is yes) then, "is the displacement vector of the current frame closer to the calculated average displacement vector than that of the best reference frame candidate so far?" (112) check is applied to iteratively find the candidate frame that is closest to the new line of sight, (the one with a translational displacement closest to the average displacement calculated in the first predetermined number of frames). This case means that the camera's line of sight significantly deviated from the previous reference frame. Therefore the new reference frame should be selected to match the new line of sight.

If the average translational displacement with respect to the last reference frame is small (which means the answer to "is the average translational displacement larger than a second translation threshold?" (111) is no) then, "is the displacement vector magnitude of the current frame smaller than that of the best reference frame candidate so far?" (114) check is applied to iteratively find the candidate frame with the smallest displacement vector. This case means that the camera's line of sight deviation from the previous reference frame is minimal. Therefore, the new reference frame should be selected closest to the previous one to minimize the visual jitter that may occur due to reference frame update.

If the average translational displacement with respect to the last reference frame is in between the first and second translation threshold (which means the answer to (110) is no and (111) is yes) then, "is the displacement vector magnitude of the current, frame smaller than that of the best reference frame candidate so far, and is the displacement vector of the current frame closer to the calculated average displacement vector than that of the best reference frame candidate so far?" (113) check is applied to iteratively find a candidate frame with the smallest displacement vector and at the same time closest to the average displacement calculated in the first predetermined number of frames.

Translation values can be of any unit and even a sub-pixel value as in a preferred configuration of the inventive method (100) in which pixel interpolations are used to stabilize the image.

In a preferred configuration of the inventive method (100), step (110) and step (111) are only implemented once for a calculated average translation value and the category determined by them is used in following cycles until a new average is calculated. This way, unnecessary checks at every cycle is prevented until a new average is calculated and a new decision must be made. A flag that identifies whether it is a first check or not is recorded for this purpose.

If the answer to (112), (113), (114) are no, this means that the new frame is not a better candidate, the method is continued by receiving a new frame. When better candidates are found for any of these cases, then the last received frame is recorded as a new candidate reference frame together with their respective displacement vector and projections in step (115).

Finally when a second predetermined number of processed frames is reached (which is larger than the first predetermined value) the "reference candidate" loop ends and best reference frame candidate so far is set as the new reference frame since this last candidate was found to be the best one for the specific case in step (117). "is the processed frame count equal to a second predetermined value?" (116) step determines whether the new reference will be set or the loop will continue. Also, to be able to restart the whole process processed frame count is reset and the candidate reference frame data is cleared in step (118).

In a preferred configuration all the recorded data (related to any recorded frame except the new reference frame projections) is cleared or deleted in step (118).

To summarize the whole process, the main steps ((101), (102), (103), (104), (105), and (106) are used in every cycle to obtain new frame data and a number of frames (first predetermined value) are obtained to determine the line of sight deviation. Subsequent frames up to the second predetermined value are treated as candidate reference frames and used to determine a new reference frame. Therefore, it can be said that the second predetermined value is larger than the first one to make the method meaningful.

When the method is first initialized, the initial reference frame is determined by receiving a new frame, setting it as the reference frame and resetting processed frame count (119) step and the method (100) continues from step (101).

A system for stabilizing image sequences (1) fundamentally comprises;
- at least one image sensor (2) to acquire sequences of digital images of the scene under consideration when necessary,
- at least one image processing unit (3) configured to receive sequence of images, implement the method for stabilizing image sequences (100) using received images, and output a stabilized image sequence using the warped images generated by the method (100),
- at least one memory unit (4) connected to image processing unit and configured to hold at least one received frame, at least one reference frame decided by the method (100), at least one candidate reference frame decided by the method (100), and any calculated translation vector, any SAD value, processed image count and any value determined by the method (100).

In a preferred embodiment of the present invention, image sensor (2) is an infrared vision camera which is able to differentiate temperature differences in the scene.

In a preferred embodiment of the present invention, image processing unit (3) is configured to receive sequence of images from image sensor (2) and output a stabilized image sequence. When doing so, the input sequence frames are used in the method for stabilizing image sequences (100) and as the method is started with step (119) it loops until the system (1) is stopped. The method (100) is carried out using these image data and it determines reference frames in predetermined intervals and warps the input frame to the output accordingly. When the method (100) keeps a record of data, it will be recorded in the memory unit (4) by the image processing unit (3). Therefore, image processing unit (3) is configured to record data to the memory unit (4) in a preferred embodiment of the present invention. The memory unit (4) is actually a frame buffer in another preferred embodiment, storing the image data to be processed.

In another preferred embodiment, image sequence is received from a recorded or live stream. The output of the image processing unit (3) is in one of the known image sequence formats and can be viewed on a display or can he fed to another image processing device.

In summary, an image sequence output that is stable and free of any sudden jumps is generated by warping input images according to the translational displacement with respect to a determined reference frame, on a sub-pixel basis. An efficient and optimized methodology to register the reference frame with the current frame is implemented using fast search algorithms. Reference frame update is optimized by dividing the average translation into three categories. These optimizations are especially applicable to image sequences whose line of sight is fixed, keeping in mind that they may drift in time.

Within the scope of these basic concepts, it is possible to develop a wide variety of embodiments of the inventive "system and method for stabilizing image sequences" (1), (100). The invention cannot be limited to the examples described herein; it is essentially according to the claims.

The invention claimed is:

1. A method for stabilizing image sequences comprising steps of:
   S1: receiving a current frame;
   S2: generating a plurality of projections for the current frame, neglecting predetermined number of pixels from the beginning and the end of projections;
   S3: calculating a translational displacement vector which is a result of sums of absolute difference (SAD) between the current frame and a reference frame through computing by superposing the respective projections in predetermined shift steps without allowing the current frame's projections to go out of the reference frame's respective projections' end points;
   S4: making a record of the translational displacement vector;
   S5: warping the current frame according to a computed translation vector and outputting a warped image;
   S6: increasing a processed frame count by one;
   S7: judging whether the processed frame count is smaller than or equal to a first predetermined value;
   S8 computing an average translational displacement vector of frames processed since a latest reference frame updates;
   S9: judging whether a recorded best reference frame candidate exists;
   S10: judging whether the average translational displacement is larger than a first translation threshold;
   S11: judging whether the average translational displacement is larger than a second translation threshold;
   S12: judging whether the displacement vector of the current frame is closer to the calculated average displacement vector than that of a best reference frame candidate;
   S13: judging whether the displacement vector magnitude of the current frame is smaller than that of the best reference frame candidate, and whether the displacement vector of the current frame is closer to the calculated average displacement vector than that of the best reference frame candidate;
   S14: whether the displacement vector magnitude of the current frame is smaller than that of the best reference frame candidate;
   S15: recording the current frame as the best reference frame candidate together with its displacement vector and projections;
   S16 judging whether the processed frame count is equal to a second predetermined value;
   S17: setting the best reference frame candidate as the new reference frame;
   S18: resetting the processed frame count and clearing the candidate reference frame data;
   S19: receiving a new frame, setting it as a new reference frame and resetting the processed frame count.

2. The method for stabilizing image sequences according to claim 1, wherein the horizontal and vertical projections are calculated for a two dimensional image by subtracting their respective averages in step S2.

3. The method for stabilizing image sequences according to claim 1, wherein sums of absolute difference (SAD) for every possible displacement, m, between $-S_{max}$ and $S_{max}$ is calculated by the following formula in step S3, neglecting lots of $S_{max}$ values at both ends of the new projection; wherein the calculating formula is as follows:

$$SAD_Y(m) = \sum_{k=S_{max}}^{N-S_{max}} |P_{H,ref}(k+m) - P_{H,cur}(k)|,$$

$$m = -S_{max} - S_{max}$$

wherein, $P_{H.ref}$ is the horizontal projection of the reference image pixels;

$P_{H.cur}$ is the horizontal projection of the current image pixels;

m is the possible displacement;

$S_{max}$ is the maximum number of neglected points at the ends of the new projection;

and m=$-S_{max}-S_{max}$.

4. The method for stabilizing image sequences of claim 1, wherein a plurality of calculations are done to estimate sub-pixel scale values by interpolating projections in between the discrete data points in step S3.

5. The method for stabilizing image sequences of claim 1, wherein a fast search method with a computational complexity of log(n) is applied in step S3.

6. The method for stabilizing image sequences of claim 1, wherein a bounding box is used to crop the received image in step S1 and step S19.

7. The method for stabilizing image sequences of claim 1, wherein the average is not calculated every time in step S8, but only calculated if the first predetermined number of processed frames is reached.

8. The method for stabilizing image sequences of claim 1, wherein step S10 is only implemented once for a calculated average translation value by keeping a record of this check as a flag and the first route determined is used in following cycles until a new average is calculated.

9. The method for stabilizing image sequences of claim 1, wherein step S11 is only implemented once for a calculated average translation value by keeping a record of this check as a flag and the first route determined is used in following cycles until a new average is calculated.

10. The method for stabilizing image sequences of claim 1, wherein all the recorded data except the new reference frame projections is deleted in step S18.

11. A system for stabilizing image sequences comprising:
at least one image sensor to acquire sequences of digital images of a scene; wherein the image sensor is an infrared vision camera which is able to differentiate temperature differences in the scene;
at least one image processing unit configured to receive sequence of images, implementing the method for stabilizing image sequences using received images, and outputting a stabilized image sequence using the warped images generated by the method as claimed in claim 1;
at least one memory unit connected to the image processing unit and configured to hold at least one received frame, at least one reference frame decided by the method, at least one candidate reference frame decided by the method, and a plurality of calculated translation vectors, a plurality of sums of absolute difference (SAD) values, a processed image count and a plurality of values determined by the method.

12. The system for stabilizing image sequences as in claim 11, wherein the image processing unit is configured to receive at least one image sequence from image sensor.

13. The system for stabilizing image sequences as in claim 12, wherein the image processing unit is configured to receive an image from a recorded or live image sequence.

14. The system for stabilizing image sequences as in claim 11, wherein the image processing unit is configured to receive an image from a recorded or live image sequence.

15. The system for stabilizing image sequences as in claim 11, wherein the image processing unit is configured to receive at least an image sequence from image sensor.

16. The system for stabilizing image sequences as in claim 15, wherein the image processing unit is configured to receive an image from a recorded or live image sequence.

17. The system for stabilizing image sequences as in claim 11, wherein the image processing unit is configured to receive an image from a recorded or live image sequence.

* * * * *